June 29, 1943.　　　　F. HILL　　　　2,323,039
WELDING APPARATUS
Filed June 21, 1941　　　2 Sheets-Sheet 1
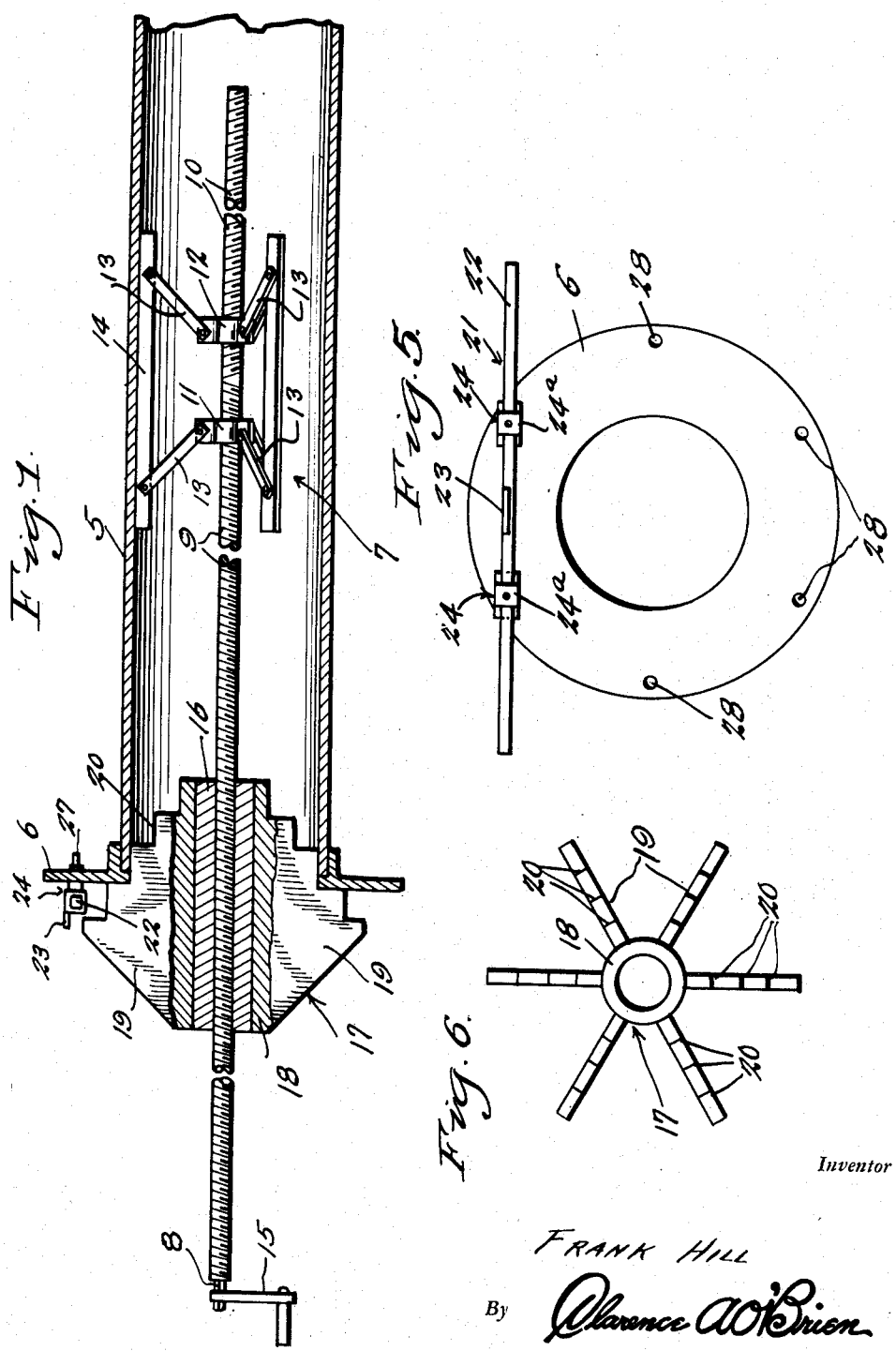
Inventor
FRANK HILL
By Clarence A. O'Brien
Attorney June 29, 1943.　　　　　F. HILL　　　　　2,323,039
WELDING APPARATUS
Filed June 21, 1941　　　2 Sheets-Sheet 2
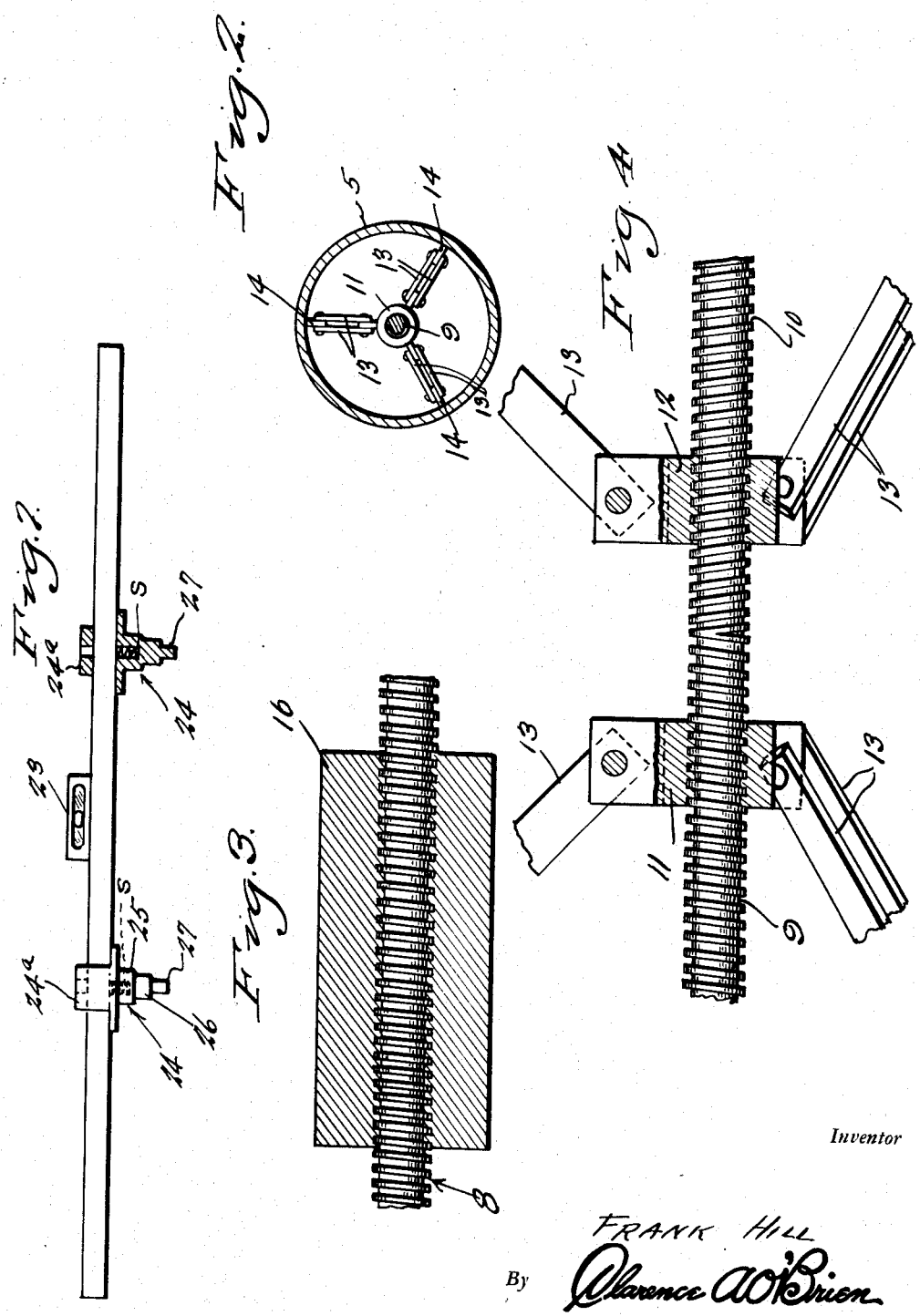
Inventor
FRANK HILL
By Clarence A. O'Brien
Attorney Patented June 29, 1943

2,323,039

UNITED STATES PATENT OFFICE 2,323,039

WELDING APPARATUS

Frank Hill, Borger, Tex.

Application June 21, 1941, Serial No. 399,183

2 Claims. (Cl. 113—103)

This invention relates broadly to welding apparatus, and particularly to the art of welding flanges on metal pipes and other cylindrical objects.

The main purpose of the present invention is to provide improved means for supporting the flange in association with the pipe to which it is being welded during the welding operation, and also to facilitate the levelling of the bolt holes in such flange.

At the present time, approximately three men are required to do the job of welding a flange to a metal pipe, and because of the human element involved in the holding of the flange, sometimes the welding thereof takes place when the flange is in improper position on the pipe with the result that the bolt holes of the flange will then not properly align with bolt holes on the flange of a second pipe to which the first pipe is to be bolted.

With this device, this probability is reduced to a minimum, and at the same time the levelling of the bolt holes is accomplished with greater accuracy.

The invention together with its objects and advantages will be best understood from a study of the following description taken in connection with the accompanying drawings wherein—

Figure 1 is a longitudinal sectional view through a portion of a pipe and a flange to be welded thereto, and illustrating the application of the invention, certain parts of the invention being broken away and shown in section.

Figure 2 is a transverse sectional view through the pipe further illustrating parts of the invention.

Figure 3 is a longitudinal sectional view through a bearing for a screw, the screw being shown fragmentarily and in elevation.

Figure 4 is a fragmentary enlarged detail view partly in section and partly in elevation of an expansible clamp forming part of the invention.

Figure 5 is an end elevational view of the flange-equipped pipe and showing the levelling device associated therewith in accordance with the present invention.

Figure 6 is an end elevational view of a flange holder forming part of the invention.

Figure 7 is a plan view of the leveller.

Referring more in detail to the drawings, it will be seen that 5 indicates generally an end portion of a pipe to which a flange 6 is to be welded at one end of the pipe.

In accordance with the present invention, there is provided an expansible and contractible clamp indicated generally by the reference numeral 7.

The clamp 7 embodies an elongated adjusting screw 8 having oppositely threaded sections 9 and 10.

Engaged with the threaded sections 9 and 10 of the screw are nuts or followers 11 and 12, and pivoted to the followers 11 and 12, through the medium of pairs of links 13, are jaw members 14 that move radially inward and outward with respect to the screw 8 as the same is rotated for feeding the nuts or followers 11 and 12 thereon in opposite directions relative to one another.

For the screw 8, which at one end is equipped with a removable crank arm 15, there is provided an elongated bearing 16, the bore of which is threaded to complement the threads 9 of the screw as clearly shown in Figure 3.

Sleeved on the bearing 16 and shiftable longitudinally thereof is a flange holder, indicated generally by the reference numeral 17.

The flange holder 17 embodies a hub 18 that accommodates the bearing 16 and a series of arms 19 that project radially from the hub 8 circumferentially about the hub as shown.

Each of the arms 19 is provided at one edge thereof with a series of stepped shoulders 20 providing seats for the flange 6 that is to be welded to the pipe 5.

In providing each arm 19 with a series of steps 20, it will be readily appreciated that the holder will, in effect, present a plurality of different diameters so that flanges of various internal diameters may be accommodated thereon.

In using the device, the clamp 7 is inserted into the pipe from one end thereof and the flange 6 is properly seated on the holder 17. Obviously, by turning the screw 8 in its bearing 6 in the proper direction, the jaws 14 will be expanded outwardly or away from the screw into gripping engagement with the interior of the wall of the pipe 5.

The holder 17 is then shifted forwardly to engage the flange 6 thereon with the adjacent end of the pipe 5 and when the clamp 7 is finally threaded home, the holder 17 will be held in position in a suitable manner for retaining the flange 6 against the pipe 5, thus permitting the welding of the flange 6 to the pipe 5 to be accomplished quickly and efficiently.

A difficulty encountered in the welding of a flange equipped with bolt holes to a pipe, in order that that pipe may be bolted to the flanged end of a second pipe, is that in the welding of the flange to the pipe care must be taken that the bolt holes in the flange, after the welding operation has been completed, will properly align with the bolt holes in the matching flange of the second pipe.

With my device as just described, the flange 6 will be held against movement after once being properly positioned relative to the pipe, and during the welding operation.

Further, to insure accuracy in the aligning of the bolt holes, I provide improved means for applying a leveller to the flange 6, and to the end that the leveller may be maintained in association with the flange during the welding operation.

Thus, in accordance with the present invention, I provide a leveller, indicated generally by the reference numeral 21.

In the preferred embodiment of the invention, the leveller 21 is in the form of a levelling bar 22 that is suitably equipped, intermediate its ends, with a spirit level 23.

Sleeved on the bar 22 are the sleeve portions 24a of what may be termed bolt-hole plugs 24.

Each plug 24 has integral with the sleeve portion 24a thereof a pin or substantially cylindrical portion that is preferably of several diameters, in the present instance of three diameters 25, 26 and 27 so as to accommodate bolt holes of different sizes.

As is well known, these bolt holes are generally provided in a circular series spaced around the flange as shown in Figure 5 wherein the bolt holes are indicated by the reference numerals 28.

In using my leveller, the plugs 24 are inserted in the topmost bolt holes 28, the pin portions of the plugs being pushed through the holes until the proper diameters of the plugs fit snugly in the holes. When that is accomplished, and as shown, the leveller is efficiently supported on the flange, and by glancing at the spirit level the operator can readily ascertain whether or not the flange is in proper rotative position with respect to the pipe 5 during the welding of the flange to the pipe. Springs S serve to retain the plugs 24 in adjusted position on the bar 22.

With the top bolt holes being level, the operator will then know that when the welding operation has been completed the bolt holes 28 of that flange will properly align with the bolt holes of the flange of the second pipe, and that accordingly no difficulty will then be encountered in bolting the flanged ends of the two pipes together.

It is thought that the nature of the invention, together with its many advantages, will be clear to those skilled in the art without further detailed description.

It will also be understood that while I have herein illustrated and described a preferred embodiment of the invention, I am fully aware that minor changes may be made therein by those skilled in the art, and in the use of devices of this general character.

Having thus described the invention what is claimed as new is:

1. In a device for holding a pipe flange in proper association with the pipe to which it is to be welded, an expansible and contractible clamp adapted to be disposed in the pipe to be expanded into clamping engagement with the interior of the pipe, said clamp embodying an adjusting screw, a bearing through which said screw is trained, and a flange holder sleeved on said bearing and adapted to be inserted through the opening in the flange to clamp the flange between the adjacent end of the pipe and adjacent portions of the flange holder, said flange holder embodying a body having a stepped surface to accommodate flanges ranging in diameter from a relatively small diameter to a relatively large diameter.

2. In a device for holding a pipe flange in proper association with the pipe to which it is to be welded, an expansible and contractible clamp adapted to be disposed in the pipe to be expanded into clamping engagement with the interior of the pipe, said clamp embodying an adjusting screw, a bearing through which said screw is trained, and a flange holder sleeved on said bearing and adapted to be inserted through the opening in the flange to clamp the flange between the adjacent end of the pipe and adjacent portions of the flange holder, said flange holder embodying a body having a plurality of diameters to accommodate flanges ranging in diameter from a relatively small diameter to a relatively large diameter, said body being in the form of a hub having a plurality of arms radiating therefrom in circumferentially spaced relation, and each of said arms having a stepped edge, with the stepped edges of the arms cooperating to provide the several diameters for the body.

FRANK HILL.